Dec. 30, 1958 W. R. JEWETT 2,866,453
DIRECT READING HYPODERMIC PRESSURE INDICATING DEVICE
Filed May 29, 1957 2 Sheets-Sheet 1
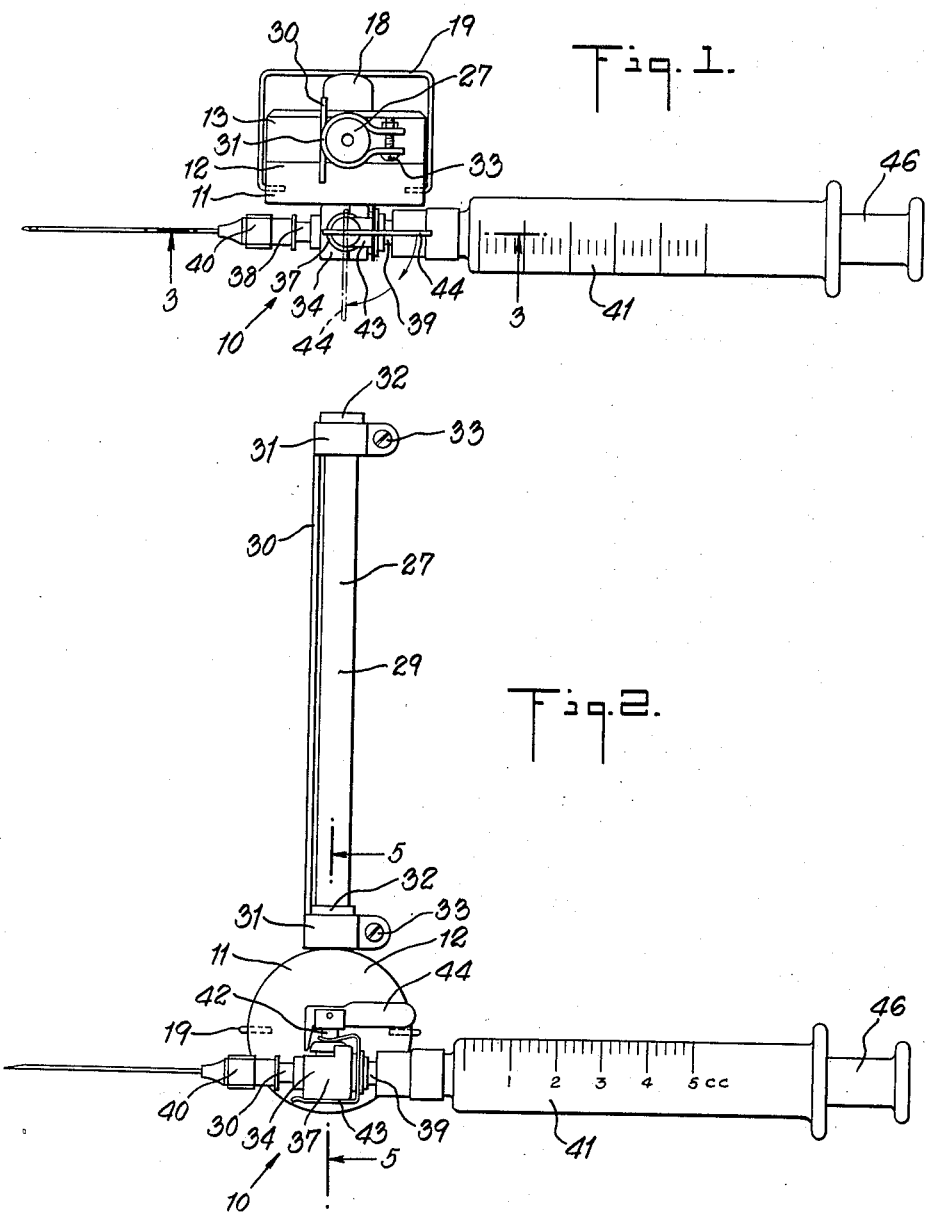
INVENTOR
WARREN JEWETT
BY
ATTORNEYS Dec. 30, 1958 W. R. JEWETT 2,866,453
DIRECT READING HYPODERMIC PRESSURE INDICATING DEVICE
Filed May 29, 1957 2 Sheets-Sheet 2
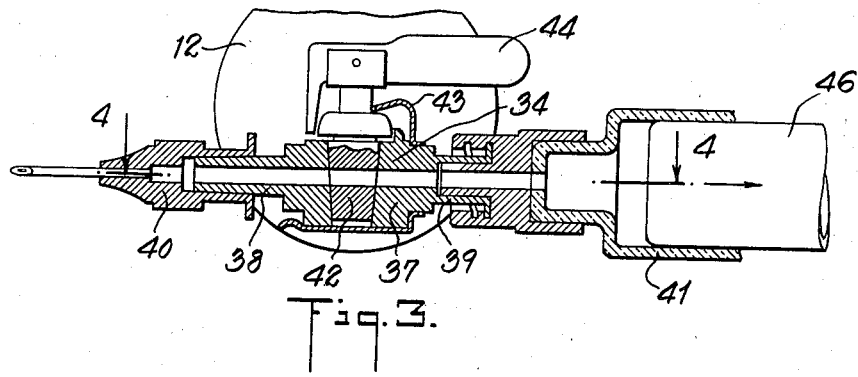
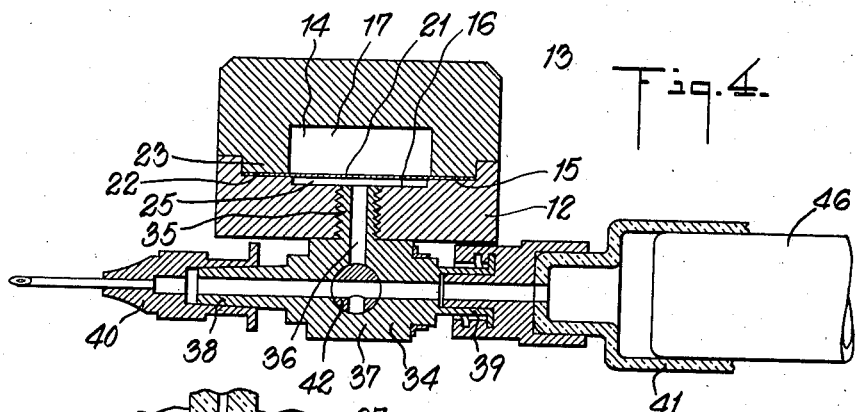
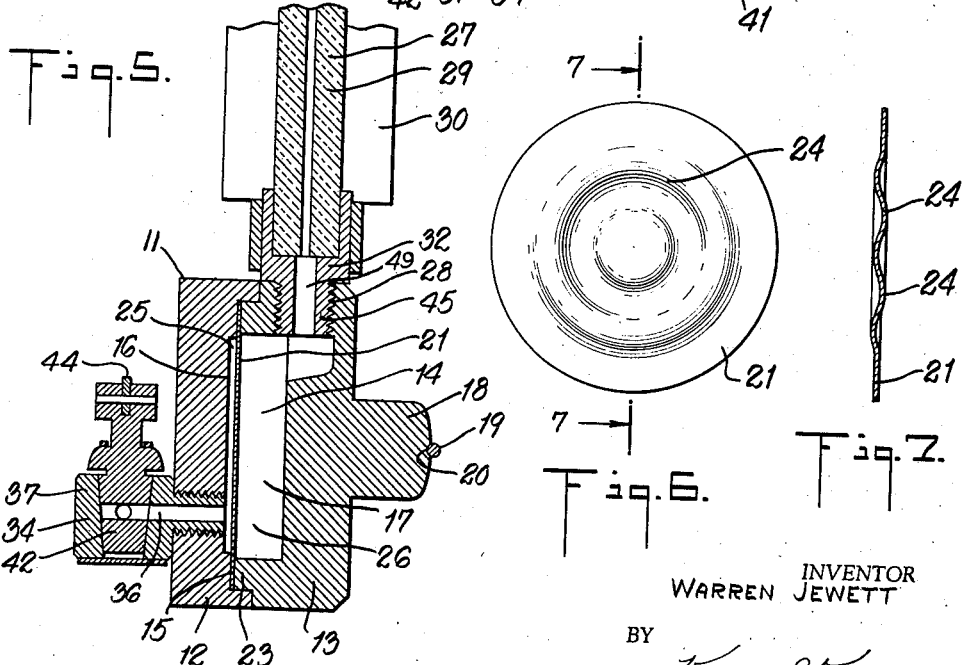
INVENTOR
WARREN JEWETT
BY
Kenyon & Kenyon
ATTORNEYS

United States Patent Office 2,866,453
Patented Dec. 30, 1958

2,866,453

DIRECT READING HYPODERMIC PRESSURE INDICATING DEVICE

Warren R. Jewett, Woodbridge, Conn.

Application May 29, 1957, Serial No. 662,490

3 Claims. (Cl. 128—2.05)

This invention relates to pressure indicating devices of the type used by the medical profession for measurement of body fluid pressures, and more particularly to a unitary, direct reading hypodermic pressure manometer especially adapted for the measurement of venous blood pressure and cerebrospinal fluid pressure.

Determination of venous blood pressure is an essential element in the diagnosis of a patient suspected of cardiac disease. A normal venous pressure ranges between 80–120 millimeters water, whereas elevations of venous pressure above that range are found in cases of congestive heart failure.

Similarly, cerebrospinal fluid pressure is normally 70–180 millimeters water, whereas elevated pressures may be found for example in cases of intracranial tumor, supperative encephalitis and cerebral abscess, hydatid cysts, extradural, subdural, subarachnoid and intracerebral hemorrhage, meningitis, acute encephalitis, hydrocephalus, craniostenosis, cerebral edema following head injury, acute nephritis, hypertensive encephalopathy and eclampsia. Lower than normal cerebrospinal pressures may be observed in such cases as spinal block by tumor, some subdural hematomas, and intracranial space occupying lesions which produce displacement of normal structures to cause pressure coning at the foramen magnum or tentorial opening.

It is an object of this invention to provide a hypodermic pressure manometer especially adapted for the measurement of venous blood pressure and cerebrospinal fluid pressure, such device being of unitary construction and capable of being handled safely and efficiently by a single person.

Another object is to provide a pocket instrument for the above uses which is adapted for carrying in a doctor's valise, thus providing a useful diagnostic instrument for the general practitioner.

An additional object is to provide a direct reading, self-contained, mechanical hypodermic pressure manometer of the above type which can be quickly disassembled for sterilization of the component parts, and then reassembled for use without calibration.

Briefly the device of the present invention is comprised of a fluid chamber constituted by a pair of matching male and femal sections which are held together by a releasable spring clamp. The female section has a raised peripheral portion on its inner surface which provides a seating area for the male section. A removable, non-corrosive diaphragm having linear pressure displacement characteristics is disposed within the chamber and between said sections so that its edge portion is held in a fluid tight relation against the seating area by the male section and the chamber is thereby divided into a smaller compartment and a larger compartment each adapted to hold liquids under pressure without leakage.

The larger compartment communicates with an external direct reading open end manometer carried by the chamber. The smaller compartment communicates with an external threeway stopcock attached to the chamber. The stopcock has a hypodermic needle and a translucent syringe plunger affixed to it. The stopcock is manually adjustable to a first position in which the syringe plunger is interconnected with the hypodermic needle so that a liquid under pressure may be drawn through the needle into the syringe under visual observation. The stopcock is also manually adjustable to a second position in which the hypodermic needle is connected to the smaller compartment so that the latter liquid is delivered into the smaller compartment and the pressure of such liquid is transmitted by lateral displacement of the diaphragm to the liquid contained in the larger compartment, whereby the pressure is directly indicated by the adjoining manometer.

The manometer, stopcock, hypodermic needle, and syringe are all releasably connected to their associated parts of the device for quick disassembly, and the overall dimensions of the apparatus, assembled or disassembled, are such that they may be easily transported and stored in a doctor's valise.

Other objects and features of the invention will become apparent in the following description and appended claims, and in the drawings, in which:

Fig. 1 is a plan view of the device assembled for use;
Fig. 2 is an elevational view of the device of Fig. 1;
Fig. 3 is a partially sectionalized fragmentary view taken along line 3—3 of Fig. 1;
Fig. 4 is a partially sectionalized fragmentary view taken along line 4—4 of Fig. 3;
Fig. 5 is a fragmentary section taken along line 5—5 of Fig. 2;
Fig. 6 is a plan view of one type of diaphragm employed in the device; and
Fig. 7 is a profile section taken along line 7—7 of Fig. 6.

Referring now to the drawings, one device embodying the features of the present invention is shown in Figs. 1 and 2 and referred to generally by the reference numeral 10. It is comprised of a housing 11, having a female section 12 and a male section 13 mating therewith (see also Figs. 4 and 5) to define an inner chamber 14. The sections are of circular cross-section as shown, although any convenient shape can be used as desired. The female section 12 has a raised inner peripheral portion or seating area 15 and a depressed inner central portion 16.

The male section 13 has an inner cavity 17 and a centrally disposed protuberance 18 on its outer rear surface 48. A U-shaped spring clamp 19 is pivotally attached to the female section 12 and is swingable around behind the male section 13 when the two sections are in a mated relationship as shown in Fig. 1 to clamp into notch 20 in protuberance 18 to hold the respective sections together.

Disposed between said sections 12, 13 is a removable circular diaphragm 21 having its peripheral edge portion 22 held in fluid tight relation against the seating area 15 by the outwardly projecting circular rim 23 in the male section 13. The diaphragm 21 is preferably constructed of a flexible, non-corrosive, relatively inelastic material capable of being sterilized in an autoclave or the like, such as stainless steel, and has a thickness of, for example, about .001 inch to provide the desired pressure sensitive characteristics. The diaphragm is preferably shaped with radially disposed concentric corrugations 24 as shown in Figs. 7 and 8 to give a linear relation between lateral displacement of the diaphragm and the pressure applied.

The diaphragm 21 as assembled divides the inner chamber 14 into a smaller blood receiving compartment 25, defined by the central portion 16 of the female section 12, and a larger indicating liquid compartment 26, defined by the inner cavity 17 of the male section 13. The smaller blood receiving compartment 25 is designed for about the minimum volume sufficient to distribute blood pressure substantially over the entire exposed area of the diaphragm whereas the larger indicating liquid compartment 26 provides sufficient volume for operating the device as will be described hereinafter.

A direct reading open end manometer 27 is removably affixed externally to the housing 11, being joined to the male section 13 by any convenient means such as threads 28 or the like to thereby interconnect with larger compartment 26 through tap hole 49. The manometer 27 consists of a capillary tube 29 of glass or the like being dimensioned, for example, about 4 inches overall length with about a 0.9 millimeter diameter bore, and a scale 30 of any convenient type having end brackets 31 adjustably positionable on the corresponding end bushings 32 of tube 29 by suitable means such as screw means 33. The scale 30 for greatest convenience can be calibrated to read directly in millimeters of water pressure, and can be adjusted for reading in any convenient direction, for example, as shown in Fig. 2.

External valve means such as three-way stopcock 34 is removably attached to the female section 12 by threaded fitting 35, and is communicable with the smaller compartment 25 through interconnecting fluid passage 36. Valve body 37 has two oppositely disposed external fittings 38 and 39, the former being appropriately adapted for the releasable attachment of a hypodermic needle 40, and the latter being adapted for the releasable attachment of a hypodermic-type syringe plunger means 41, both being of any well-known type used by the medical profession. One such type of fitting is known as "Luer-Lok" and connecting and disconnecting may be easily accomplished by rotating the respective fittings relative to one another through a short arc, e. g. clockwise to connect, and counterclockwise to disconnect, such fittings providing a good liquid-tight seal under the hypodermic pressures encountered.

Valve plug 42 is maintained in place within valve body 37 by means of removable spring clamp 43, and is rotatable by means of handle 44 from a position as shown in solid outline in Fig. 1, wherein the hypodermic needle 40 is operatively interconnected with the syringe 41 (see also Figs. 3 and 4), to the position ninety degrees removed therefrom, as shown in dotted outline in Fig. 1, at which the hypodermic needle 40 is connected directly to the smaller compartment 25.

Operation of the above device is carried out as follows. After the separate components have been properly sterilized, the diaphragm 21 is inserted against the seating area 15 and the male section 13 mated with female section 12 to bring the projecting rim against the peripheral edge 22 of the diaphragm 21, the clamp 19 being then locked into place against notch 20 on the protuberance 18. Holding the assembled housing 11 in an upright position, i. e. with tap hole 28 facing upward, an indicating solution such as water or the like (with or without coloring added) is poured into the tap hole 49 to fill the larger compartment 26 all the way up to the top of the tap hole 49. The manometer 27 is then attached to the housing 11 by screwing bottom bushing 45 into the tap hole 49. The volume of the larger compartment 26 is so designed to provide sufficient water or indicating liquid to send liquid up the tube and give readings on the scale for pressure ranges as desired, such as for venous pressures or cerebrospinal fluid pressures as previously mentioned, when the device is filled as just described.

After assembly of the hypodermic needle 40 and the syringe 41 on the valve body fittings 38 and 39 respectively, the stopcock handle 44 is turned toward the syringe 41 as shown in Figs. 1 and 2, and the device is ready for use.

Determination of venous pressure is accomplished by applying a tourniquet to the upper arm of the patient holding the assembled device 10 in one hand in an upright position, and performing veinpuncture with the hypodermic needle 40 in the usual fashion. Entrance of the needle 40 into the vein is confirmed by the visual indication of a flow of blood into the syringe 41 when plunger 46 is withdrawn. The tourniquet is thereupon released, allowing an equilibration of pressure, and then the stopcock handle 44 is turned to the dotted position shown in Fig. 1 to connect the needle 40 and venous pressure directly with the smaller compartment 25 so that the blood will flow into the latter and exert its pressure against the diaphragm 21. The diaphragm 21 transmits the pressure by lateral displacement, e. g. to the right as viewed in Fig. 5, to the indicating liquid in the larger compartment 26 which is consequently caused to rise in the manometer tube 29 to a point at which the venous pressure can be visually read directly on the scale 30. After such reading, the needle can be removed from the vein in the usual prescribed manner and the device disassembled and sterilized for reuse.

When measuring cerebrospinal fluid pressure, the device is assembled in the same way as before. Spinal puncture is performed in a well-known manner, e. g. by lying the patient on his side with knees flexed. The area to be pierced, usually the third or fourth lumbar interspace, is prepared by sterile cleansing, then infiltrated with one percent procaine and then the hypodermic needle 40 is introduced into the prepared area. Penetration into the spinal canal may be felt by the giving away of the spinal ligaments. With the stopcock handle 44 positioned as in Fig. 2, the plunger 46 is gently withdrawn, and if the needle 40 is properly located, there will be a visual indication in the syringe 41 thereof by the dripping of cerebrospinal fluid therein. The handle 44 is immediately turned to connect the needle 40 to the smaller compartment 25, and the cerebrospinal fluid pressure is read on the manometer 27 as before.

Thus it can be seen that the present invention provides a self-contained, mechanical, instantaneous-reading, self-recording device especially adapted for the determination of venous blood pressure and cerebrospinal fluid pressure. The instrument is simple in construction and operation, can be quickly dismantled and assembled without special skill, and is made of non-corrosive parts capable of sterilization. The dimensions are such that the device can be carried in the pocket or valise and can be manipulated by a single person in use.

While one embodiment of the invention has been shown and described, it is to be understood that certain changes and additions can be made to the device by those skilled in the art without departing from the scope and spirit of the invention.

I claim:

1. Apparatus for measuring venous blood pressure and the like comprising a fluid chamber constituted by a pair of matching male and female sections, a diaphragm disposed within said chamber and having its edge portion held between said sections whereby said chamber is divided into a first larger and a second smaller compartment, means for releasably urging said sections together in a seating relationship, external direct reading manometer means carried by said chamber and being interconnected with said first compartment and adapted for indicating the pressure on a liquid contained within said first compartment, valve means affixed to said chamber adjacent said second compartment, a hypodermic needle and a translucent syringe means each attached to said valve means, said valve means being manually adjustable from a first position in which said syringe plunger is interconnected with said hypodermic needle whereby a liquid under pressure may be drawn through said needle into said syringe plunger under visual observation, to a second position in which said hypodermic needle is connected to said second compartment, whereby the latter said liquid is delivered into said second compartment under the latter said pressure, and the latter said pressure is transmitted by said diaphragm to the liquid contained in the first compartment.

2. Apparatus for measuring venous blood pressure and the like comprising a fluid chamber constituted by a pair of matching male and female sections, the female section having a raised peripheral portion on its inner surface to provide a seating area for said male section, a diaphragm disposed within said chamber and having its edge portion held against said seating area by said male section whereby said chamber is divided into a first larger and a second smaller compartment, means for releasably urging said sections together in a seating relationship, external direct reading manometer means carried by said chamber and being interconnected with said first compartment and adapted for indicating the pressure on a liquid contained within said first compartment, valve means affixed to said chamber adjacent said second compartment, a hypodermic needle and a translucent syringe means each attached to said valve means, said valve means being manually adjustable from a first position in which said syringe plunger is interconnected with said hypodermic needle whereby a liquid under pressure may be drawn through said needle into said syringe plunger under visual observation, to a second position in which said hypodermic needle is connected to said second compartment, whereby the latter said liquid is delivered into said second compartment under the latter said pressure, and the latter said pressure is transmitted by said diaphragm to the liquid contained in the first compartment.

3. Apparatus for measuring venous blood pressure and the like comprising a fluid chamber constituted by a pair of matching male and female sections, the female section having a raised peripheral portion on its inner surface to provide a seating area for said male section, a removable non-corrosive diaphragm having linear pressure displacement characteristics disposed within said chamber and having its edge portion held in fluid tight relation against said seating area by said male section, thereby dividing said chamber into a first larger and a second smaller compartment, spring clamp means for releasably urging said sections together in a seating relationship, an external direct reading open end manometer means carried by said chamber and releasably affixed thereto, said manometer means interconnected with said first compartment and adapted to indicate the pressure on a liquid contained within said first compartment, a three-way stopcock valve means removably affixed to said chamber adjacent said second compartment, a hypodermic needle and a translucent syringe means both removably attached to said stopcock valve means, said stopcock valve means being manually adjustable from a first position in which said syringe plunger is interconnected with said hypodermic needle whereby a liquid under pressure may be drawn through said needle into said syringe plunger under visual observation, to a second position in which said hypodermic needle is connected to said second compartment, whereby the latter said liquid is delivered into said second compartment under the latter said pressure, and the latter said pressure is transmitted by said diaphragm to the liquid contained in the first compartment.

References Cited in the file of this patent

UNITED STATES PATENTS

| | | |
|---|---|---|
| 2,535,998 | Bierman | Dec. 26, 1950 |
| 2,600,324 | Rappaport | June 10, 1952 |
| 2,625,153 | Baum | Jan. 13, 1953 |
| 2,783,768 | Smoot | Mar. 5, 1957 |

OTHER REFERENCES

"Surgical Equipment," vol. 2, No. 3, May, June, 1935, page 12. (Copy in Div. 55.)

"American Heart Journal," vol. 37, No. 5, April 15, 1949, pages 771–773. (Copy in Div. 55.)